Oct. 27, 1942.   W. A. WEIGHTMAN   2,299,776
PANEL WELDING MACHINE
Original Filed June 25, 1938   7 Sheets-Sheet 2
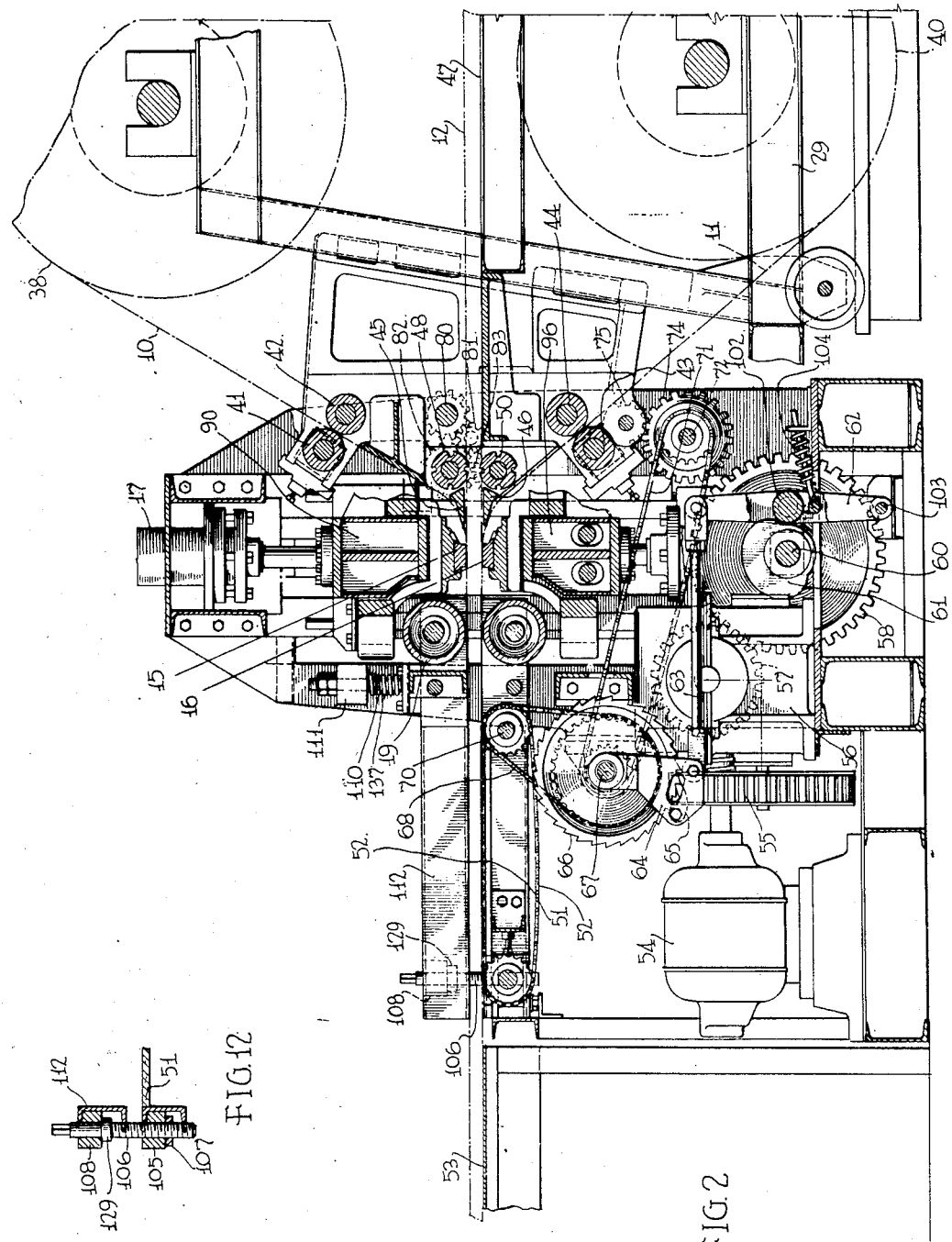
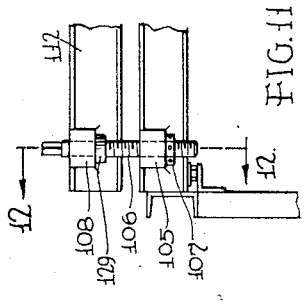
INVENTOR.
WILLIAM A. WEIGHTMAN
BY
ATTORNEY.

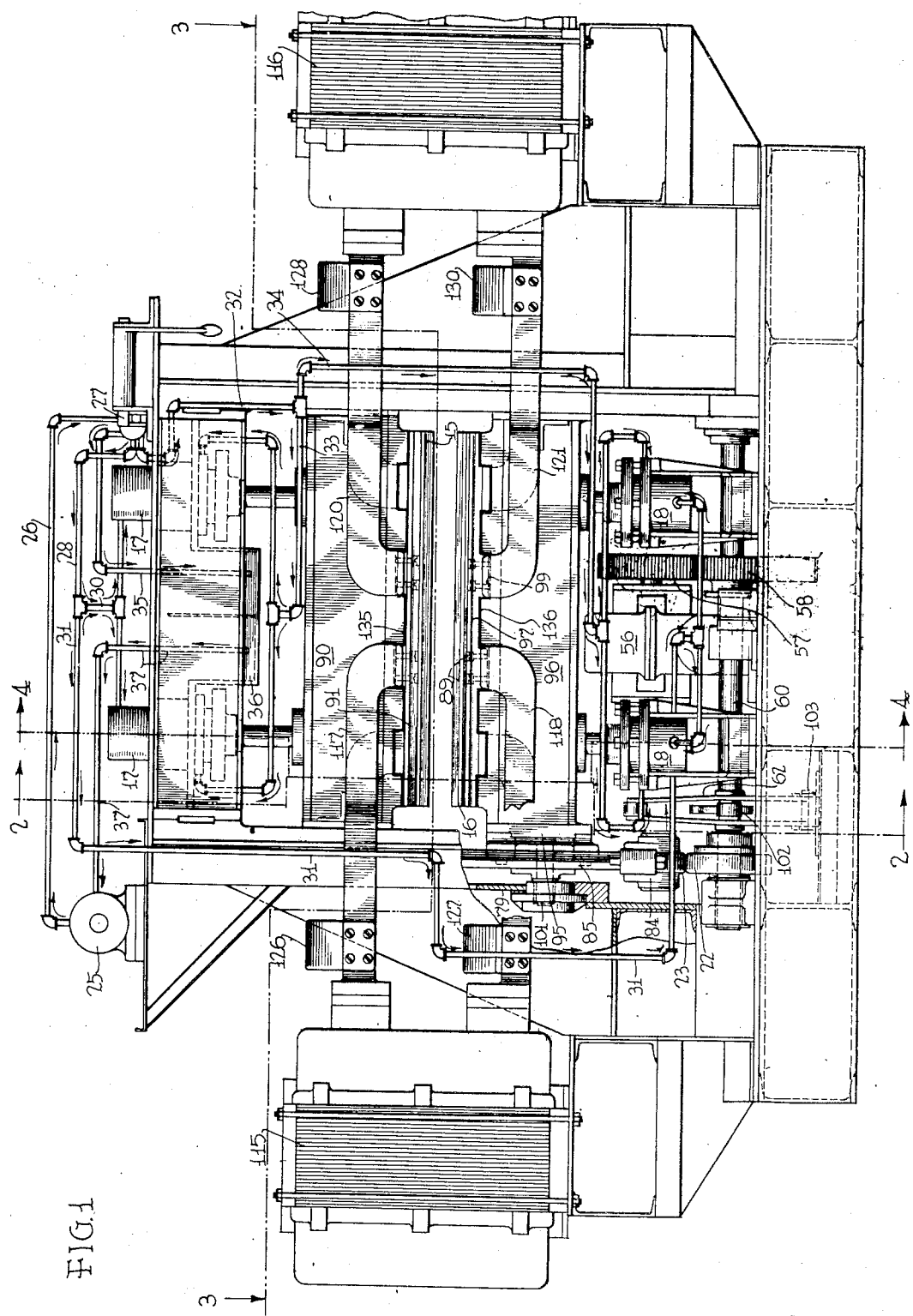

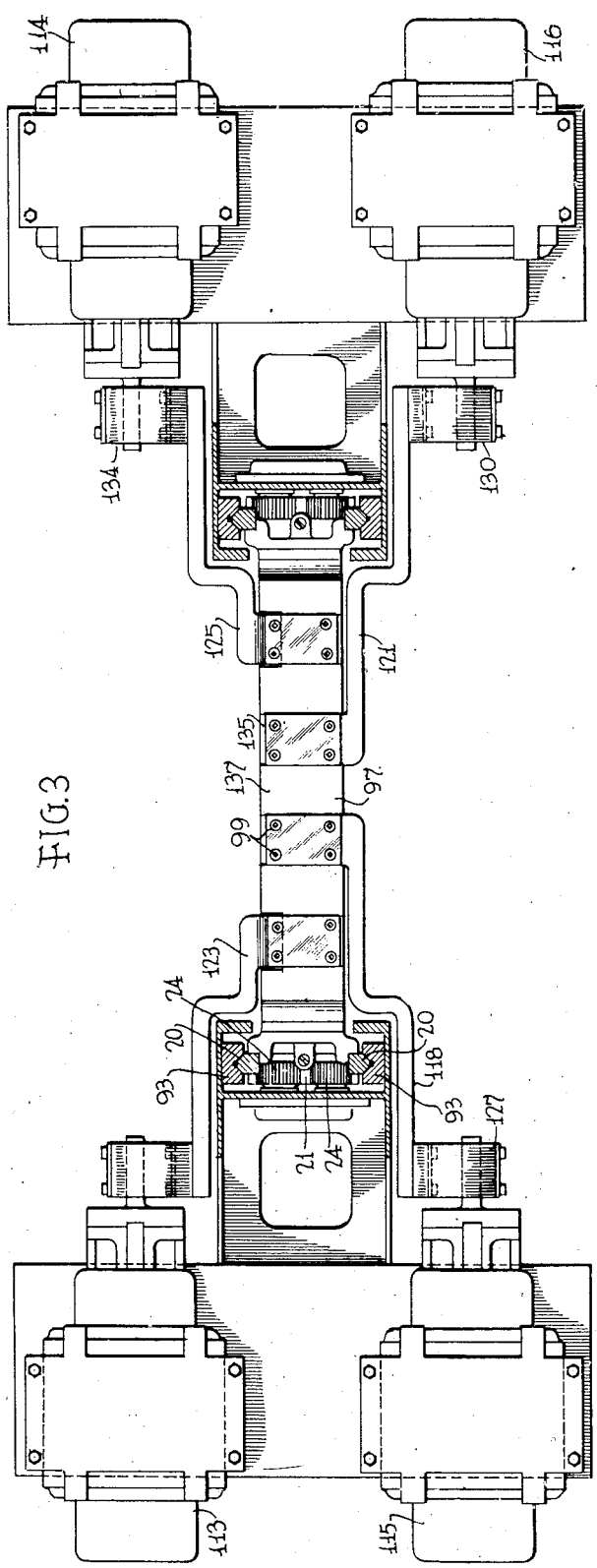

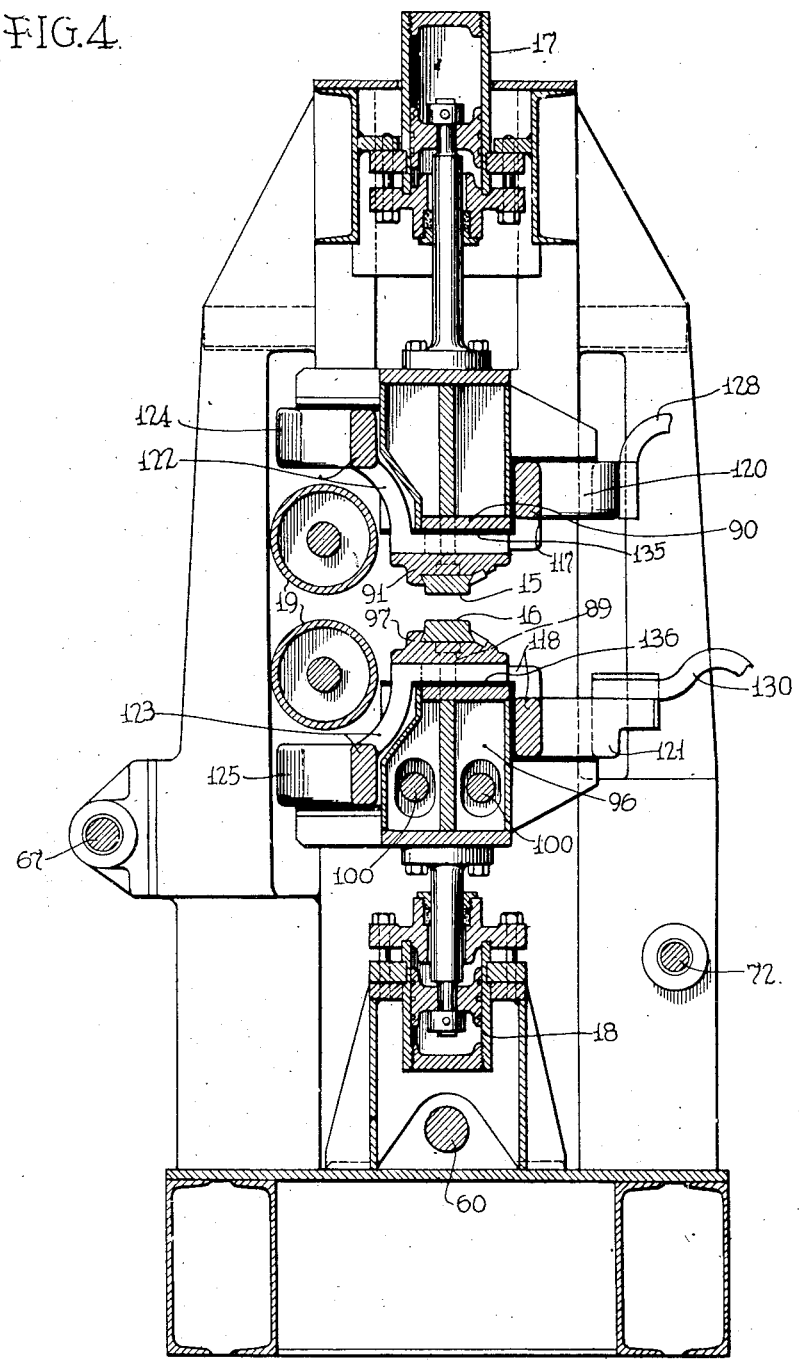

Oct. 27, 1942.  W. A. WEIGHTMAN  2,299,776
PANEL WELDING MACHINE
Original Filed June 25, 1938   7 Sheets-Sheet 5
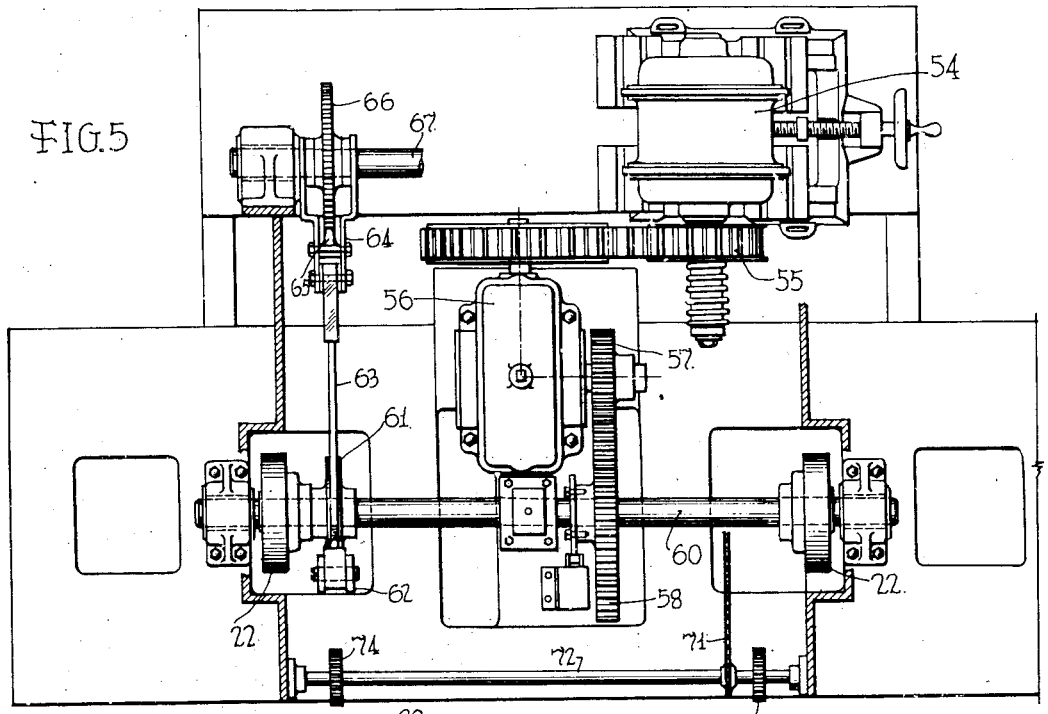
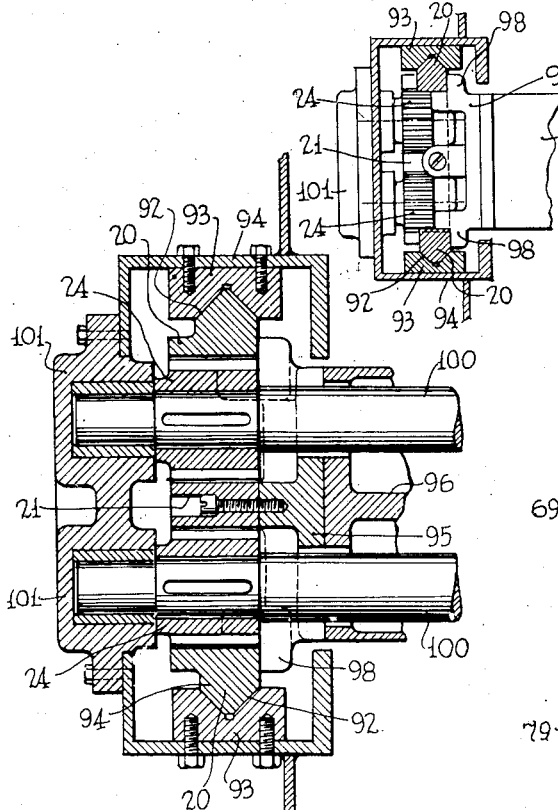
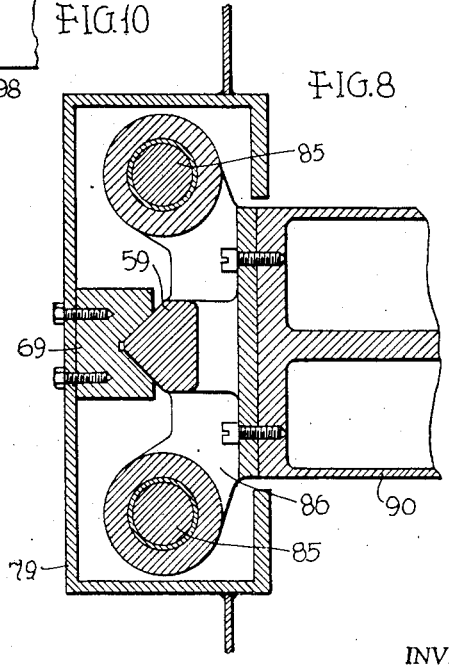
INVENTOR.
WILLIAM A. WEIGHTMAN
BY
ATTORNEY.

Oct. 27, 1942.  W. A. WEIGHTMAN  2,299,776
PANEL WELDING MACHINE
Original Filed June 25, 1938    7 Sheets-Sheet 6

INVENTOR.
WILLIAM A. WEIGHTMAN
BY
ATTORNEY.

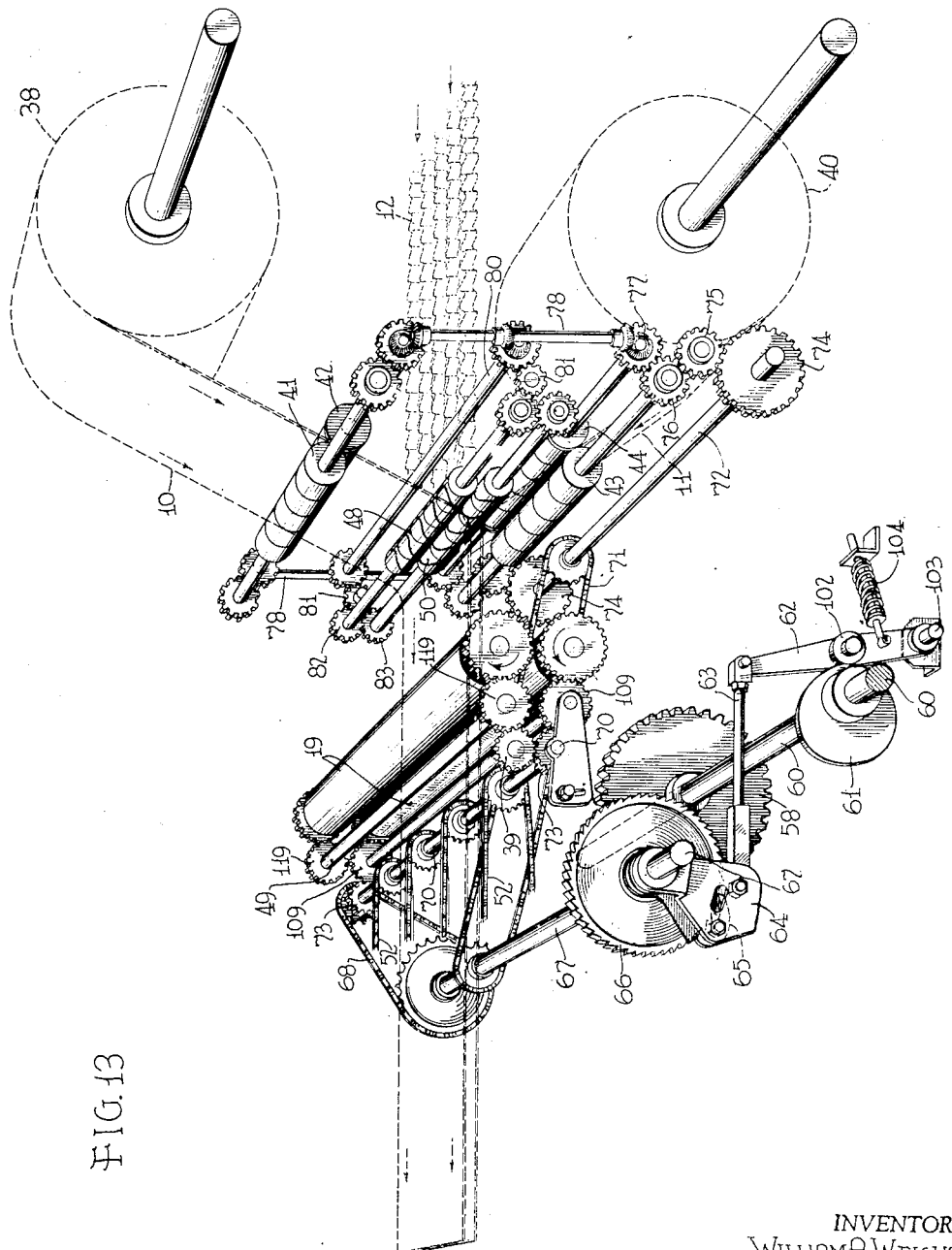

Patented Oct. 27, 1942

2,299,776

UNITED STATES PATENT OFFICE 2,299,776

PANEL WELDING MACHINE

William A. Weightman, Philadelphia, Pa., assignor to Edward G. Budd Manufacturing Company, Philadelphia, Pa., a corporation of Pennsylvania Original application June 25, 1938, Serial No. 215,741. Divided and this application April 9, 1941, Serial No. 387,702

8 Claims. (Cl. 219—4)

The present invention, which is a division of my copending application Serial No. 215,741, filed June 25, 1938, relates in general to welding and in particular to automatic electric welding machine tools for fabrication of composite structures by electric welding.

The main object of the invention is the quantity production of double walled sheet metal paneling, and to accomplish such production through the provision of an automatic welding machine and improved method of fabrication whereby strong, light double walled sheet metal paneling of definite desirable width may be produced in any desired length. Another object of the invention is the provision of means whereby flatness and smoothness of hollow panels of large area is assured.

An ancillary object is the provision of means whereby hollow panel structures of indefinite length may be fabricated in relatively small increments of length extending the full width of the panel.

The present invention has to do especially with the fabrication of a panel by spud welding or projection welding a pair of cover sheets to an intervening spacing member formed with spuds or other projecting portions of reduced cross-sectional area to be melted down and welded to the cover sheets. Such welding is effected by pressing the cover sheets against the intervening member between platen electrodes of an area sufficient to include several of the spuds and through which electrodes a welding current is supplied which heats the spuds to welding temperature and effects a welding of the spuds to the cover sheets. This type of welding is hereinafter referred to as platen welding to distinguish from that form of projection welding in which the members to be joined are pressed between electrodes of relatively small area covering but one projection or spud, or in which the members are pressed between rollers which contact with the work along a line constituting a geometrical element of the roller.

One of the most difficult problems has been that of obtaining flatness in panels of a size necessitating fabrication by increments. It has been found that attempts to spud weld, one at a time, small areas a fraction of the length and breadth of the panel, by means of platen electrodes covering such small areas, have resulted in buckling of the cover sheets between the welded and the surrounding unwelded area. One solution proposed was to spud weld at different times fractional areas less in length and breadth than that of the panel being fabricated, and under relatively high pressure sufficient to force the cover sheet, directly under the platen, into flat form and sufficient to strain back to flatness any buckled material in the surrounding area during the subsequent platen welding of that area. This, however, is particularly difficult with hard, resilient, flow resisting steel such as high tensile stainless steel.

Applicant has discovered that such buckling is due mainly to the fact that the height of the spuds, although slight, is sufficient to cause substantial cupping or dishing-in of the welded area with respect to the surrounding area, or area into which at least a portion of the sunken area is reentrant, which results in a buckling of the bordering metal, that this buckling is due to an attempt to offset the cover sheets on a curved or broken line, and that if the offsetting of the welded portion from the unwelded portion can be confined to a single straight line or zone, the bordering metal need be simply flexed or bent without strain. This enables the adjoining area of the cover sheets to be brought into the plane of the welded area by a simple reverse flexing or bending of the previously bent portion and without strain or buckling.

According to the present invention the desired results are accomplished by platen welding the assemblage of cover sheets and spacing elements over fractional areas each extending substantially the full length of one dimension of area of the panel assemblage and a fraction of the length of the other dimension but sufficient to bridge the space between at least two spuds. Preferably the platen welding is effected over an area extending substantially the full width of the panel and a small fraction of the length so that the welded panel is fabricated in increments of length.

Another advantage of this method, other than that of avoidance of warping and buckling is that it enables the unwelded portion of the cover sheets to approach the welding platens or dies at an angle to the spacing elements sufficiently wide to avoid contact with those spuds which lie beyond the platens, thus avoiding a burning or flashing off of such spuds.

Various other objects and advantages of the invention will be apparent from a perusal of the following specification and the drawings accompanying the same.

In the drawings:

Fig. 1 is a front elevation of the machine with the feeding-in portion removed.

Fig. 2 is a longitudinal section taken on the line 2—2 of Fig. 1.

Fig. 3 is a section on the line 3—3 of Fig. 1 with the lower welding die removed and certain portions below the plane of the section omitted for the sake of clearness.

Fig. 4 is a section on the line 4—4 of Fig. 1 showing the fluid operated die-moving mechanism, and with the feed mechanism and gearing omitted for the sake of clearness.

Fig. 5 is a top plan view of the base portion with the super-structure removed and the die moving cylinders omitted for the sake of clearness.

Figure 7:
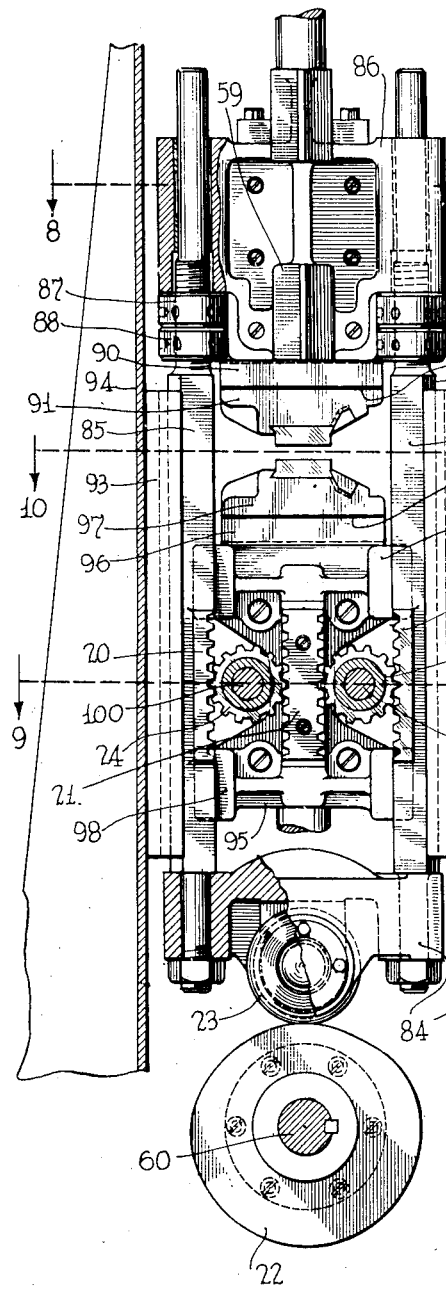
Fig. 7 is a side elevation of the portion of the machine shown in Fig. 6 looking from the left of Fig. 6.

Fig. 8 is a section on the line 8—8 of Fig. 7.
Fig. 9 is a section on the line 9—9 of Fig. 7.
Fig. 10 is a section on the line 10—10 of Fig. 7.

Fig. 11 is a fragmentary view on the same scale as Fig. 2 showing the means for adjusting the out-feed guide.

Fig. 12 is a section on the line 12—12 of Fig. 11.

Fig. 13 is a schematic diagram of the intermittent feed mechanism.

Fig. 14 is a fragmentary perspective view of a paneling structure, the finished product of the machine, with a portion of the cover plate broken away.

Fig. 15 is a diagrammatic plan view of a portion of paneling showing the extent of the welding steps in the process.

Fig. 16 is an enlarged fragmentary sectional view showing a portion of the structure in one stage of fabrication.

It is believed that a complete understanding of the machine will be more readily grasped after first obtaining knowledge of the product sought and to this end reference is to be had to Fig. 14 showing a portion of a completed double walled panel structure. This is of the type shown and described in the patent to Edward G. Budd No. 2,108,795, issued February 22, 1938, and which consists of a pair of sheet metal plates 10 and 11 secured together and spaced apart by a plurality of undulatory sheet metal spacing strips 12 spud welded edgewise to the cover plates. The undulatory form of the spacing elements 12 enables the spacing elements to hold themselves in position in edgewise contact with the cover plates prior to the welding of the plates to the spacing strips without the use of jigs or other temporary holding means and enables them to be held firmly against the welding pressure during the welding operation without such additional holding means, making it possible to platen weld the sheets to the spacing elements through several spuds simultaneously.

According to the present method of production, the spacing strips 12 (Fig. 16) formed with a plurality of spuds 13 are positioned between the cover plates in general parallelism as indicated in Figs. 14 and 15, the cover sheets being of definite width and indefinite length. The welding of the cover sheets to the spacing strips 12 is effected through a pair of opposed platen electrodes 15 and 16 so proportioned with respect to the width of the sheets and the spacing of the spuds as to extend the full width of the sheet but only a fraction of the length of the sheet sufficient to bridge a plurality but relatively small number of the spuds of each spacing strip, in the present instance three spuds of each spacing strip as indicated by the areas marked off by the dotted lines 92 in Fig. 15. Thus the welding is effected in a series of steps each covering an area the full width of the panel and a fraction of the length forming three spud welds 14 on each of the spacing strips.

By making the spuds of general triangular form each with a base adjoining the edge of the spacing strip and the apex positioned to contact with the cover plate, a high initial welding temperature at the point of contact and a rapid setting up of the metal of the spuds is assured in an early stage of the welding operation thus reducing the time interval between contact with the first and last spuds to a minimum and assuring a substantially instantaneous contact and initiation of welding operation on all of the spuds throughout that portion of the assemblage extending between the welding dies. The uniform width of the spacing strip 12 between the spuds throughout its length results in a firm flat seating of the plates on the edges of the spacing strip with a definite predetermined uniform spacing between the plates after the spuds are melted down and welded to the plates, thus assuring a uniform thickness and flatness of the finished product. Ordinarily, a disadvantage of platen welding fractional areas at different times as heretofore suggested in the art, is the increased tendency to warping, but this is overcome in the present instance by welding fractional areas covering a narrow strip or band extending the entire width of the panel, and limiting the area by reducing it in one direction only. By welding over an elongated area extending the full width of the panel in a direction at right angles to the direction of extension of the spacing strips and extending but a short distance in the direction of extension of the strips, the advantage attained is that the cover sheets are spud welded down flat against the edges of the spacing strips in a plane offset from that of the adjoining unwelded structure, with the inwardly offset welded area extending in a straight-line direction throughout one dimension of the structure and separated from the remaining elevated portion by a single straight line along which the cover sheets are sprung or bent without strain as distinguished from an attempt to offset a fractional area having a corner or other broken or curved line of juncture with the adjoining unwelded portion which latter would cause severe buckling due to forcing the metal to bend along other than a straight line. The latter disadvantage, of course, would be amplified in proportion to the height of the spuds. With the present method the spuds may be made the maximum height desirable for a good spud weld.

The advantage of operating upon a relatively narrow strip extending the full width but only a fraction of the length of the assemblage, and a fraction of the length of each spacing strip, is that it reduces the requisite total instantaneous application of power and permits such limited requisite power to flow through a portion of each spacing strip adjoined on at least one end by an indefinite extension, affording an area of spread of current path of greater breadth than that included in the width of the welding dies and larger in proportion to the whole structure than the proportion of spuds welded at any one time.

Another advantage of limiting the total area welded at one time and consequently the maximum necessary current capacity of the current supply source is that it limits the ratio of maximum instantaneous current flow to one or a small number of spuds as might occur at the instance of initial contact of the welding dies with the work, that is during that instant before the plates have made good contact with all or a greater portion of the spuds underlying the welding electrodes.

Referring now to the machine for accomplishing this method, such machine comprises essentially a pair of upper and lower welding dies 15 and 16 of a length substantially equal to or greater than the width of the panel to be fabricated and of a width sufficient to include but a small number of the spuds on a spacing strip, for example three spuds, such welding dies 15 and 16 being arranged to be moved into and out of clamping relation with the work at will by means of fluid operated motor cylinders 17 and 18. Such fluid motor means thus affords means for normally resiliently holding the dies in clamping position under a predetermined pressure determined by the pressure supplied to the fluid motor means. The dies are also arranged to be mechanically moved out of clamping relation with the work against the tension of the fluid motor means, the upper die by means of outer rack elements 20 arranged to be periodically moved upwardly against the tension of the fluid motor means 17 by a die-operating cam 22 and cam roller 23, and the lower die by a central rack 21 to which motion is transmitted from the racks 20 through idler pinions 24, to move the lower die in the opposite direction against the tension of the fluid motor means 18.

Motor working fluid for the working cylinders is supplied by a constant pressure pump 25 through a supply line 26 and a control valve 27 to the clamping-pressure supply line 28 branching through lines 30 and 31 to the back ends of the motor cylinders 17 and 18, respectively, and through the retraction-movement supply line 32 which branches through lines 33 and 34 to the front side of the motor cylinders 17 and 18, respectively. It is to be understood that the valve 27 is arranged in known manner to connect the supply pipes 28 and 32 alternately with the main supply pipe 26 and exhaust pipe 35. Exhaust pipe 35 is arranged to discharge into a sump 36 from which the liquid is withdrawn through pipe 37 for return to the constant pressure pump 25. Where the pressure fluid is air or other gaseous fluid, the sump will of course be unnecessary. It may also be pointed out here that the chief purpose of the fluid motors 17 and 18 being to bias the dies toward clamping position under predetermined pressure, they may be substituted by springs or equivalent cushioning means adjustable in known manner to the required tension. However, the advantage of the use of the reversible fluid motors is that by operating valve 27 to reverse the distribution of fluid supply to the motors, the top die-frame end piece 86 and consequently the top die 15 may be raised to a higher level than that effected by the operating cam 22, where special occasion requires as in initial loading of the machine. This is made possible by the fact that the top end-piece 86 may move upwardly from the supporting nuts 87 independently of the racks 85, as will be hereinafter more clearly described.

The sheet metal material for the cover sheets of the finished paneling is supplied from a pair of parallel rolls 38 and 40 of the material carried in widely vertically spaced relation on a stock support and feed-in mechanism, assembled on a movable frame 29. This stock sheet material for the cover sheets of the finished article is fed in between the welding dies through pairs of feed-in, power-driven squeeze rolls 41—42 and 43—44 arranged to feed the cover sheets 10 over a pair of transverse guard rails 45—46, and between the welding dies 15—16. The spacing strips 12 are fed in between the cover sheets in predetermined spaced relation by means of a pair of strip feeding rolls 48—50 having carrier elements in the form of annular projections shaped to provide spaced holding grooves extending around the rollers in substantially sinuous form to substantially conform to the form of the spacing strips and to engage upper and lower margins of the strips to feed them in between the cover sheets at the same rate as the cover strips. The welded assemblage of cover sheets and spacing strips is fed out from between the welding dies through out-feed rolls 19 over the out-feed bed 51 by means of feed chains 52 onto the discharge platform 53. The function of the guard rails 45—46 is to maintain the cover sheets 10 out of contact with the unwelded spuds on the spacing strips except those included between the dies.

Driving power is supplied to the feed mechanism from an electric motor 54, through chain drive 55 (Figs. 2 and 5), reduction gear 56, gear 57 and the main drive gear 58 to main drive shaft 60 on which is mounted the die operating cam 22 which latter is so shaped as to effect a periodic separation of the dies with intermediate pauses or periods of non-movement while the dies are in clamping position. Intermittent movement of the feed mechanism is effected through the feed cam 61 carried by the main drive shaft 60 arranged to oscillate the feed ratchet actuating arm 62 connected through a link 63 with the pawl arm 64 carrying a feed pawl 65 for driving the feed ratchet 66 which imparts intermittent rotary motion to the main intermittent drive shaft 67. From the main intermittent drive shaft 67 motion is transmitted through sprocket chain 68 to a jack shaft 70 from which motion is transmitted to the plurality of out-feed conveyor chains 52. The jack shaft 70 supplies timed intermittent motion through gears 73, 39, 109 and 119 to the out-feed rolls 19. The intermittent drive also transmits intermittent feed motion through sprocket chain 71 to the main in-feed drive shaft 72 from which motion is transmitted through gear 74, idler gear 75 and gears 76 and 77 to the lower pair of in-feed pinch rollers 43—44, and through the vertical shaft 78 and suitable bevel gearing to the upper pair of in-feed rollers 41—42. The vertical shafts 78 through suitable bevel gearing also transmit motion through the idler gears 81 and gears 82—83 to the pair of spacer-element feed rolls 48—50. It is to be understood, of course, that the intermittent feed mechanism just described and the welding electrode operating mechanism driven by the cam 22 are operated in synchronism and in such timed relation that the welding electrodes will be moved into and out of clamping relation with the work only during the pauses in the intermittent feed motion of the work.

Referring now, more in detail to the machine structure, the cam roller 23 through which the die operating cam 22 operates to actuate the welding dies against the tension of the fluid motor elements is carried by a yoke 84 mounted on the lower ends of the outer rack bars 85 which extend upwardly to the top die-frame end-piece 86 to support the latter through adjusting and supporting nuts 87 and lock nuts 88.

Figure 6:
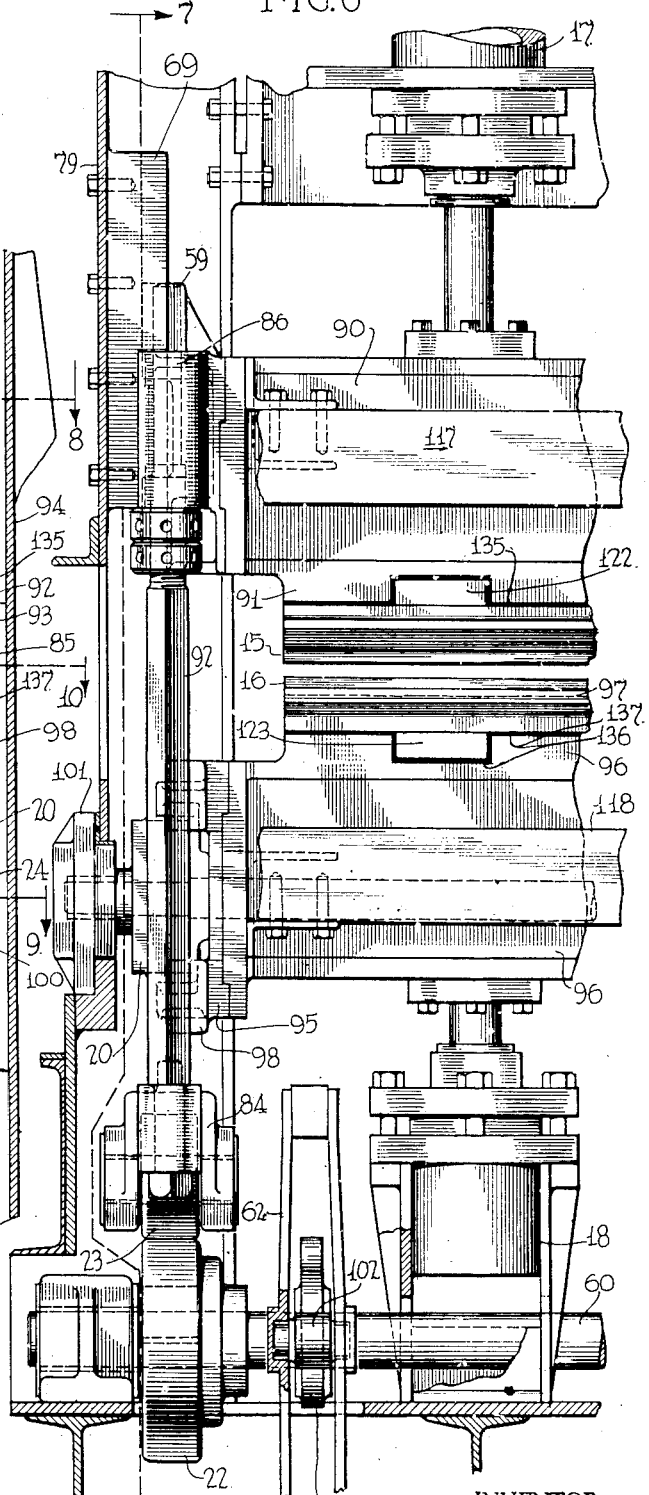
Fig. 6 is a fragmentary front elevation partly in section and with the feeding-in mechanism omitted, showing on an enlarged scale the mechanical and fluid operated die-moving mechanism.

The top end-pieces 86 of which there are two, one at the top at each side of the machine, carry the top die frame 90 which extends across the machine, and carries the top die holder 91 which in turn carries the top die 15. Vertical reciprocatory motion of the rack bars 85 therefore effects a corresponding motion of the top die frame 90 through end pieces 86. The top die frame 90 together with end pieces 86 and outer rack bars 85 on each side of the machine are thus moved up and down as a unitary element guided by means of the gibs 93 with which the beveled bearing surfaces 92 of the rack bars 85 engage, and also by the beveled bearings 59 and gibs 69 on each side of the top portion of the machine, which latter hold the die frame and its end pieces 86 against lateral displacement. The beveled bearing elements 59 are carried on and as part of the top die frame end-pieces 86 while the gibs 69 are bolted to the side frame member 79 as indicated at the upper lefthand corner of Fig. 6.

The vertical reciprocatory motion imparted to the inner rack bar 21 results in vertical reciprocatory motion of the lower die frame end-piece 95 to which the rack 21 is secured, the end piece 95 being slidably mounted on the outer rack bars 85 through which it has bearing by means of the gibs 98 carried by the end piece 95 and arranged to receive the angular corner surfaces of the rack bars 85. The lower die frame end-pieces 95 of which there are two at each side of the machine carry the lower die frame 96 which in turn carries the lower die holder 97 on which is mounted the lower die 16. Because all of the mechanism just above described is duplicated on the other side of the machine, the idler shafts 100 on which the idler pinions 24 are mounted extend across the machine to a similar set of idler pinions on the other side not shown in the present drawings but which it will be understood are arranged relative to mechanical die operating mechanism on the other side of the machine including inner and outer racks similar in all respects to those above described. The relation of the idler shafts 100 to the other parts of the machine is shown in various of the figures, for example, Figs. 4, 7, 9 and 10. As indicated at the lefthand side of Fig. 6, the idler shafts 100 have bearing at each side of the machine in a yoke member 101, shown more in detail in Figs. 9 and 10.

Referring more in detail to the intermittent feed drive, reference being had to Figs. 2, 5, 6, and 13, particularly Fig. 13, the intermittent motion for the feed drive is derived from the main power shaft 60 through feed cam 61 which bears against the cam roller 102 journaled near the center of the oscillating arm 62 pivoted to the framework of the machine at 103 at its lower end and biased against the cam 61 by compression spring 104. Oscillatory motion of the arm 62 is transmitted to the pawl arm 64 which latter is pivoted on the main intermittent drive shaft 67 and carries the driving pawl 65 arranged to engage the ratchet 66 secured to the shaft 67. The entire intermittent feed motion is derived from the main intermittent drive shaft 67 as previously described.

Referring now to the out-feed mechanism carried on the lower and upper feed bed frames 51 and 112, respectively, reference is to be had to Figs. 2, 11, 12, and 13. The lower feed bed frame 51 supports the lower feed roller 19 and out-feed conveyor chains 52 which support the weight of the finished product and feed it outwardly to the left (Fig. 2). For effecting adjustment of the limit of upward movement of the outer end of the top feed frame 112, the ends of the side members at either side of the bottom feed frame are each provided with a lug 105 (Figs. 11 and 12) in which is secured the lower end of a spacing bolt 106 adjustably secured in the lug 105 by threaded engagement therewith and lock nut 107.

The upper end of the spacing bolts 106 are arranged to pass freely through lugs 108 secured one at each side of the rear end of the top outfeed frame 112, the bolts being supported by means of shoulders 129 thereon engaging the top of the lugs. Thus by temporarily releasing the lock nut 107 and rotating the threaded bolt 106 by means of the squared top end, the height of the top frame 112 may be adjusted.

The front end of the top feed frame 112 and the upper feed roller 19 carried thereby are limited in their downward movement by supporting bolts 110 one at each side of the front end of the frame, secured to the frame and supported from lugs 111 secured to the main stationary frame of the machine, the bolts being free to move upwardly through the openings in the lugs and adjustably limited in their downward movement by the lock nuts on the upper ends. The front end of the frame is normally urged toward its lowermost position by compression springs 137 surrounding the bolts 110 and bearing against the lugs 111 and the top of the frame 112.

Welding current is supplied to the upper and lower welding dies from a set of four power supply transformers numbered 113 to 116 respectively. The secondary circuits of these transformers are connected with the upper and lower welding electrodes 15 and 16 through suitable heavy leads such as the leads 117 to 121 shown in Fig. 1, and 123, 125, 118 and 121 shown in Fig. 3, and the leads 124, 125, 120 and 121 shown in Fig. 4. These various leads, for example, 118 and 121, Figs. 1, 3 and 4, are connected with the terminals of their respective transformers through flexible conducting links such as 127 and 130 to permit movement of the massive rigid leads with the dies relative to the stationary transformers such as 115 and 116. The bottom die 16 is fed by the lower leads 123, 118, 125 and 121 of the transformers, which leads extend over the top of the lower die frame 96 and bear thereagainst through insulating material 136, and lie in electrical contact with the lower die 16 and are secured thereto by means of bolts 89 countersunk in the lower die element 16 and threaded into openings 99 in the end terminals of the transformer leads. The upper die 15 is connected for current supply through leads from the upper terminals of the transformers, such as leads 117 and 120 (Fig. 1), in a manner similar in all respects to that just described for the connection of the bottom die.

The die holders 91 and 97 are insulated throughout from their die frames 90 and 96, by the interposed layers of insulating material 135 and 137, respectively, the die holders being secured to their respective die frames through any known or other suitable form of insulated securing means such as by screw bolts insulated in known manner from at least one of the joined elements.

While one specific embodiment of the invention has been herein shown and described for the sake of disclosure, it is to be understood that the invention is not limited to such specific embodiment but contemplates all such variants and modifications thereof as fall fairly within the scope of the appended claims.

What is claimed is:

1. In a welding machine tool, a pair of opposed welding dies, means for intermittently feeding a pair of metallic sheets and an intervening metallic spacing member between said dies, yieldable fluid motor means arranged to hold said dies in clamping relation with the work assemblage of sheets and spacing members, means operable in timed relation with said intermittent movement for intermittently moving said dies out of clamping relation with the work assemblage against the resistance of said yieldable motor means, said fluid motor means being reversible to move the dies out of clamping position beyond the reach of said intermittent die moving means independently thereof.

2. In a welding machine tool, a pair of opposed welding dies, means for intermittently moving the work between the dies, reversible fluid motor means for moving the dies into and out of clamping relation with the work, and other means for intermittently moving the dies out of clamping relation with the work against the force of said fluid motor means.

3. In a welding machine tool, a pair of opposed welding dies, means for intermittently feeding a pair of metallic sheets between the dies, means for intermittently feeding a plurality of sheet metal spacing strips lengthwise between the pair of metallic sheets, said feeding means having moving carrier elements shaped to provide spaced holding grooves for the spacing strips, and means for moving the dies into and out of clamping position during the pauses between the intermittent feeding movements.

4. In a welding machine tool, a pair of opposed platen welding dies, means for intermittently moving a work piece between the dies, fluid pressure means normally tending to move the dies toward each other into yieldable clamping relation with the work, a pair of sliding racks one connected with each die for moving the latter against the resistance of said fluid pressure means, an idler pinion having a fixed axis and meshed with said racks for transmitting motion from one rack to the other and means for intermittently moving one of said racks in timed relation with said intermittent work piece moving means.

5. In a welding machine tool, a pair of opposed platen welding dies, means for intermittently moving a work piece between the dies, tension means normally tending to move the dies toward each other into clamping relation with the work, a pair of sliding racks one connected with each die for moving the latter against the tension of said tension means, an idler pinion for transmitting motion from one rack to the other and means for intermittently moving one of said racks in timed relation with said intermittent work piece moving means, said means for moving one of said racks including a driving element having a connection with the rack permitting movement of the rack in one direction independently of the said driving element, and means operable at will for moving said rack in said one direction.

6. In a welding machine tool, a pair of opposed platen welding dies, means for feeding a pair of metallic cover sheets and an intervening metallic spacing member between said dies and means situated on the entering side of the dies between the spacing member and the cover sheets for maintaining the cover sheets out of electrical contact with the spacing member on the entering side of the dies.

7. In a welding machine tool, a pair of opposed elongated, platen welding dies each having a length several times its width, means for supporting a pair of parallel rolls of sheet metal strip material of a width substantially equal to the length of the dies, relatively widely spaced in a direction normal to their axes, a pair of driven feed rolls for each strip arranged to feed their respective associated strips between the dies in a direction at substantially right angles to the direction of length of said dies, strip feeding means arranged to feed a plurality of sheet metal spacing strips lengthwise between said sheet metal strip material in edgewise contact therewith in a direction at substantially right angles to the direction of length of the dies, means for operating said feed rolls and strip feeding means intermittently in synchronism, and means operable in timed relation to said feed rolls and strip feeding means for moving said dies into and out of clamping relation with the intervening assemblage of sheet metal strip material and spacing strips only during the pauses in the intermittent feed operation.

8. In a welding machine tool, a pair of opposed welding dies, means for intermittently feeding a pair of metallic sheets between the dies, means for intermittently feeding a plurality of sheet metal spacing strips lengthwise between the pair of metallic sheets, and means for moving the dies into and out of clamping position during the pauses between the intermittent feeding movements.

WILLIAM A. WEIGHTMAN.